United States Patent [19]
Lenhart

[11] Patent Number: 5,451,125
[45] Date of Patent: Sep. 19, 1995

[54] CONTROLLED SPEED SINGLE FILE CONVEYOR FOR MULTISIZE ARTICLES

[75] Inventor: Ronald A. Lenhart, Lakewood, Colo.
[73] Assignee: Simplimatic Engineering Company
[21] Appl. No.: 326,865
[22] Filed: Oct. 21, 1994

Related U.S. Application Data

[63] Continuation-in-part of Ser. No. 180,968, Jan. 14, 1994.
[51] Int. Cl.[6] .............................................. B65G 51/03
[52] U.S. Cl. ............................................................ 406/88
[58] Field of Search ............................................ 406/86, 88

[56] References Cited

U.S. PATENT DOCUMENTS

| | | | |
|---|---|---|---|
| 4,462,720 | 7/1984 | Lenhart | 406/84 |
| 4,561,806 | 12/1985 | Lenhart | 406/88 |
| 4,744,702 | 5/1988 | Wiseman et al. | 406/88 |

*Primary Examiner*—Andrew C. Pike
*Attorney, Agent, or Firm*—Fields, Lewis, Rost & Smith

[57] ABSTRACT

A controlled speed single file conveyor selectively conveys a first set of upright cylindrical articles having a smaller diameter and a second set of upright cylindrical articles having a larger diameter in single file along a deck plate, having inboard and outboard edges, from an upstream location to a downstream location. A first set of a plurality of longitudinal, parallel rows of smaller inboard louvers and a second set of a plurality of longitudinal, parallel rows of larger outboard louvers extend through the deck plate at a shallow angle and are angled so that the air discharged therefrom has a force vector component toward the inboard side edge and a force vector component in the downstream direction. A vertical wall, parallel to the inboard edge, is vertically and laterally adjustable above the upper surface of the deck plate and has a lower edge above the deck plate forming a variable exhaust opening therebetween to control the exhausting of air therethrough to control the downstream speed of the articles. The wall is selectively movable in the inboard and outboard directions to be positioned adjacent the smaller inboard and the larger outboard louvers to selectively convey the larger diameter and the smaller diameter articles, respectively.

20 Claims, 9 Drawing Sheets

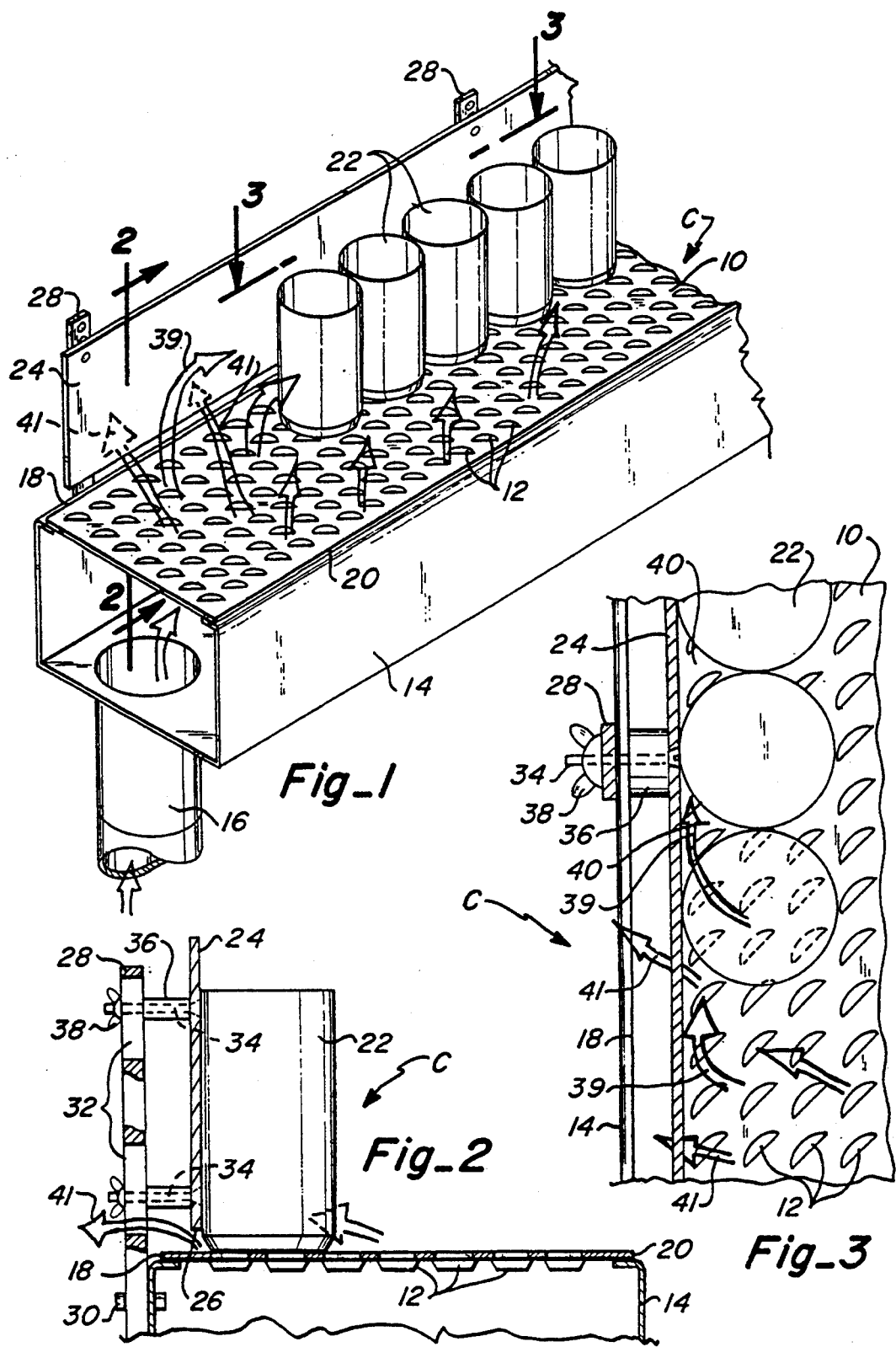

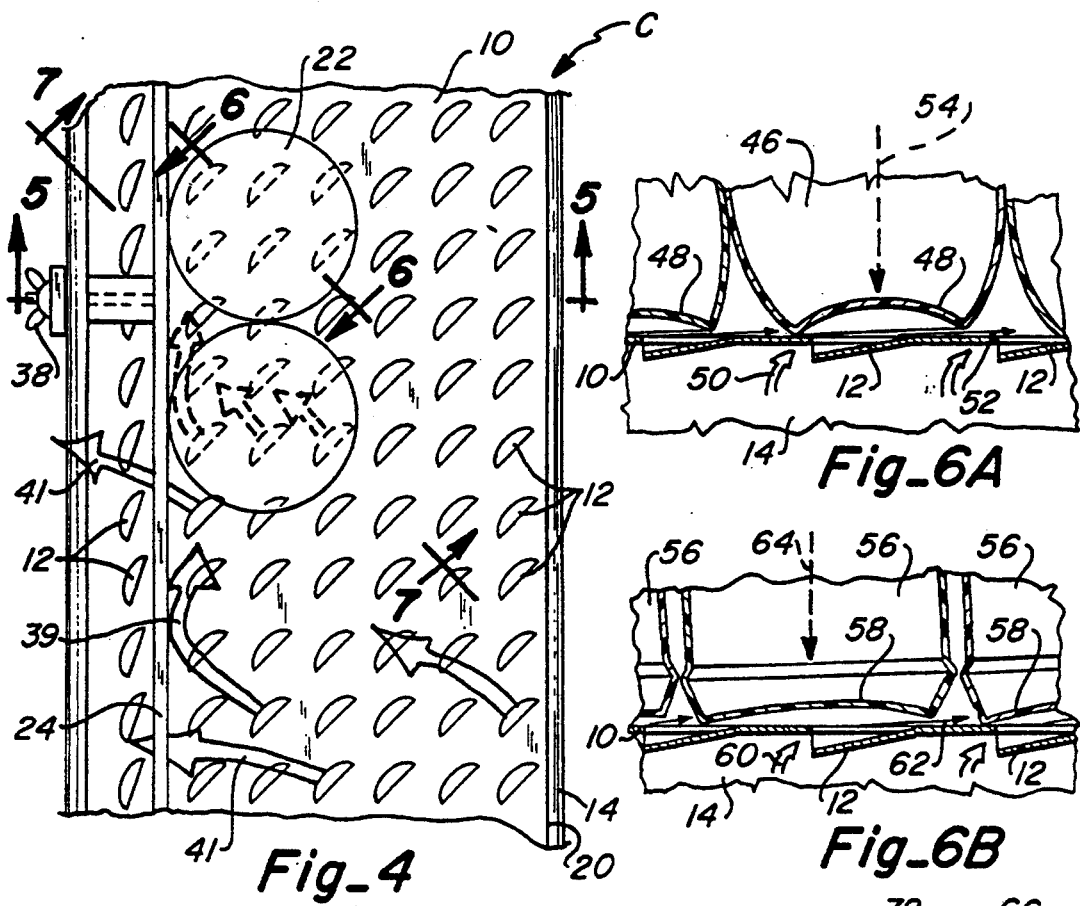
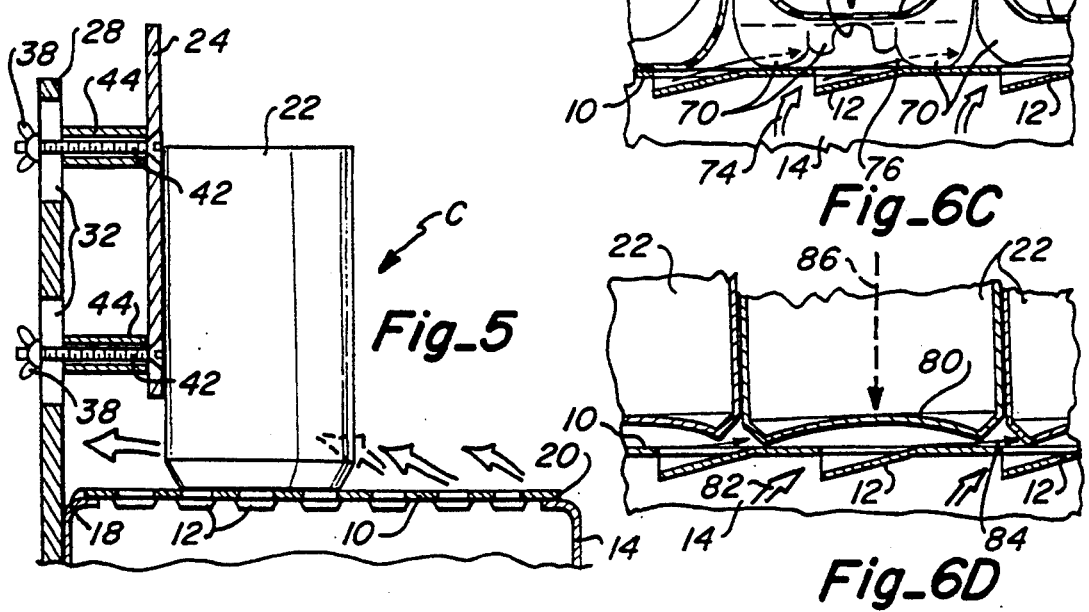

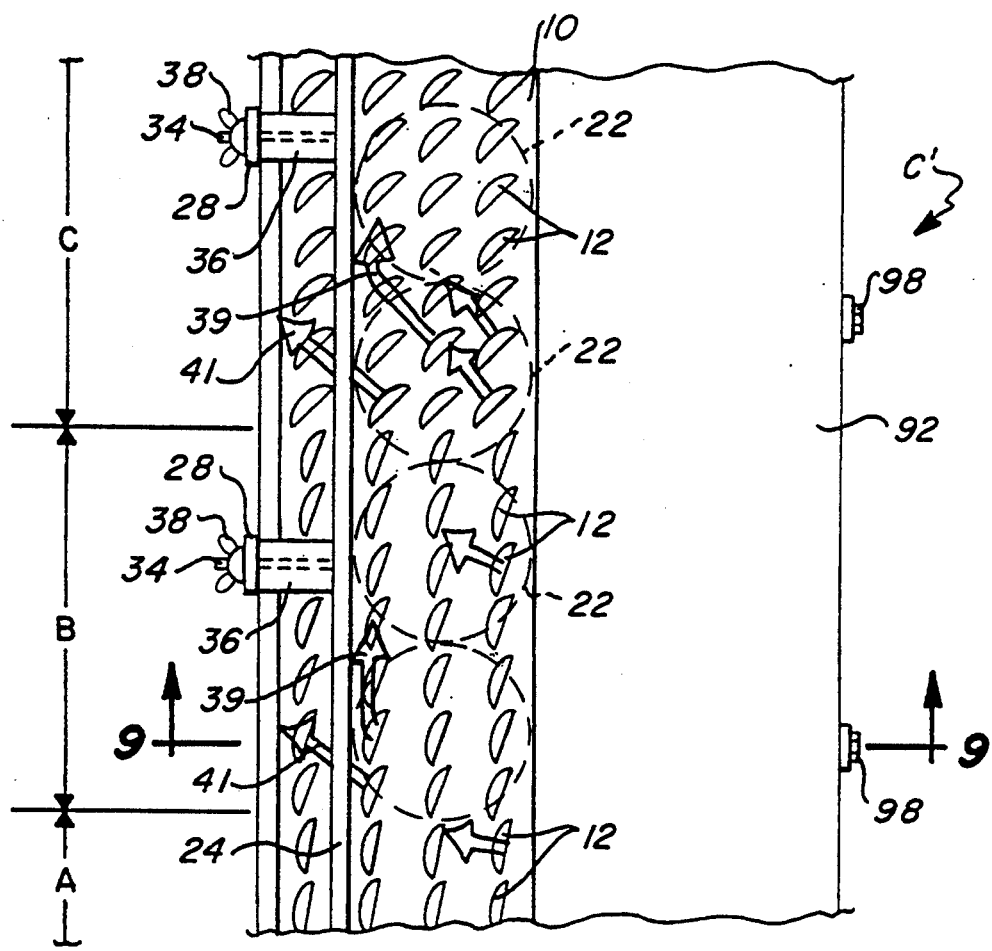
Fig_8
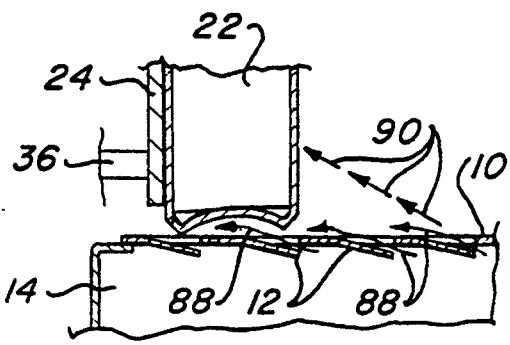
Fig_7
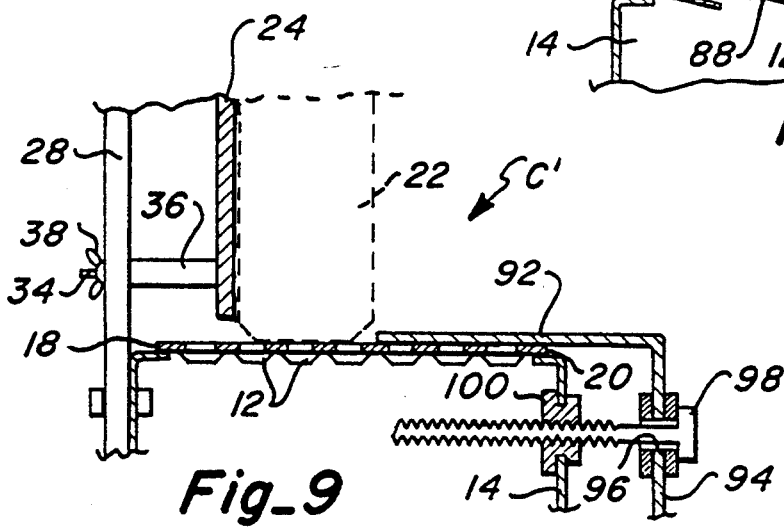
Fig_9

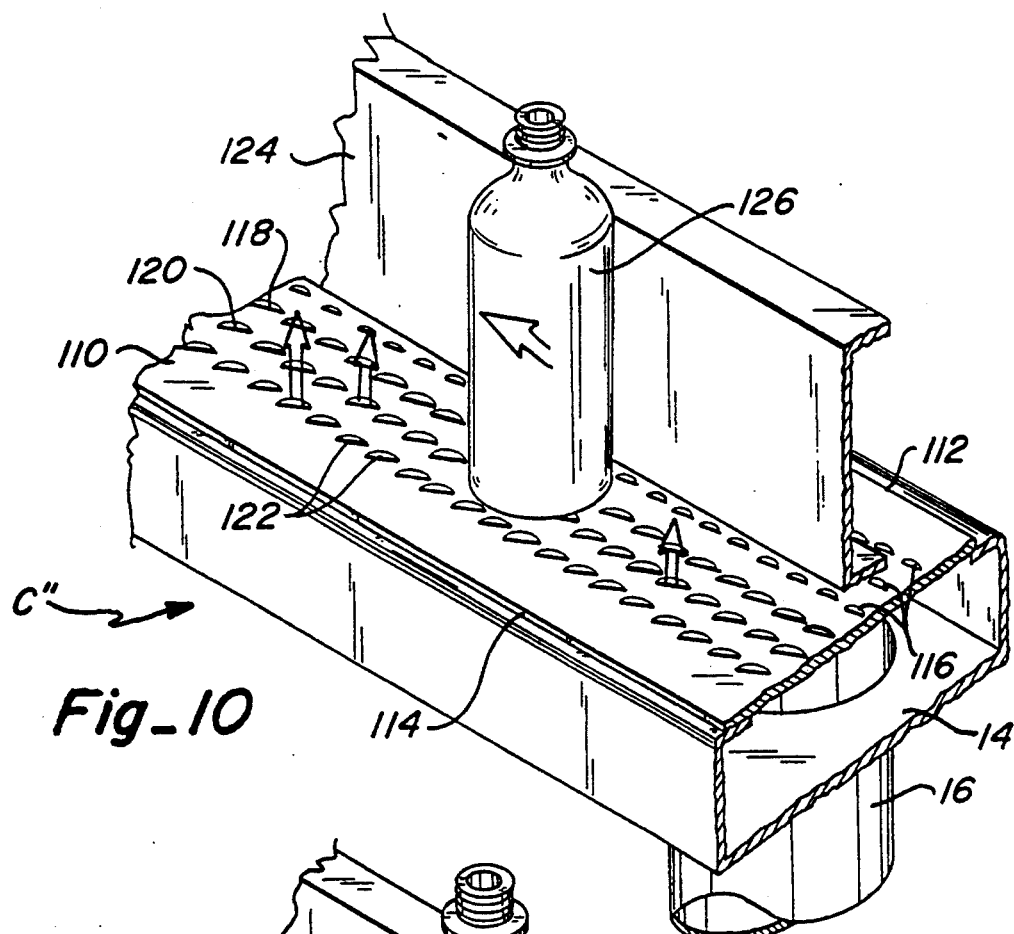
Fig_10
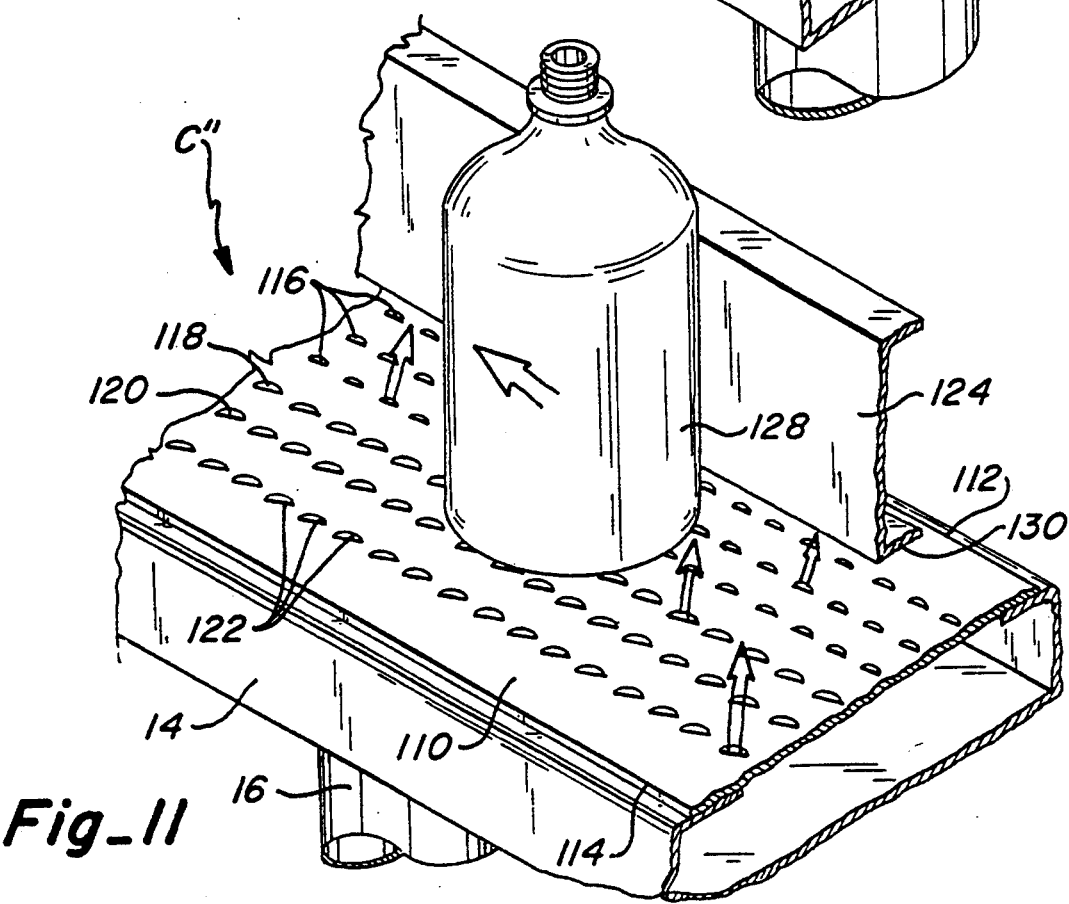
Fig_11

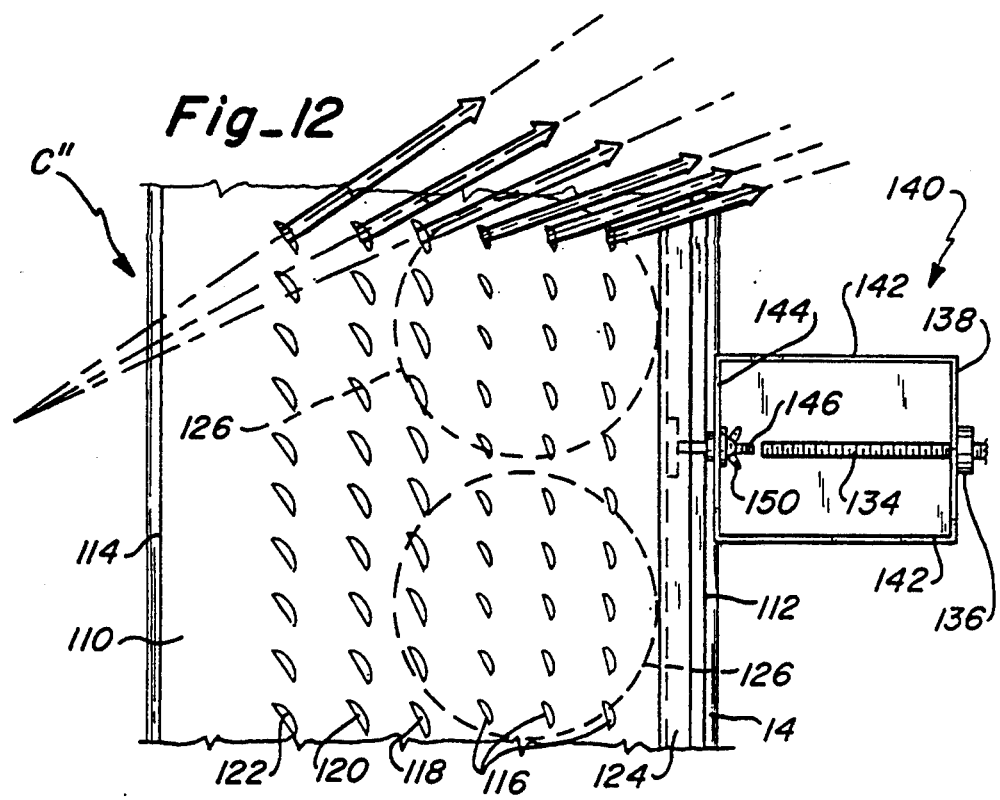
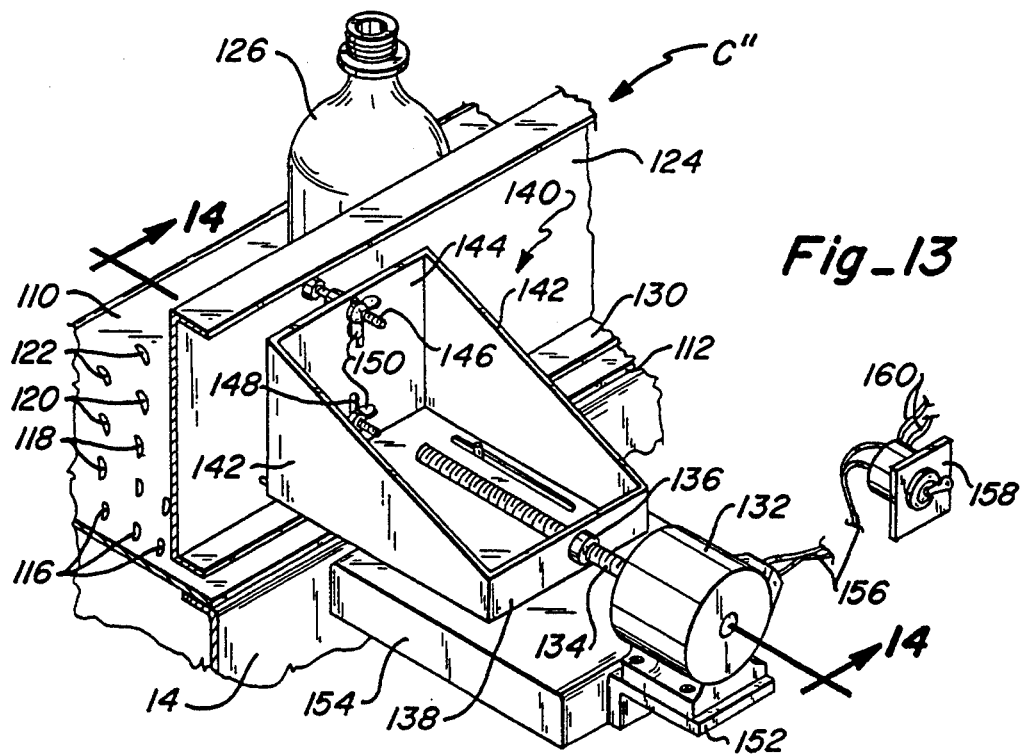

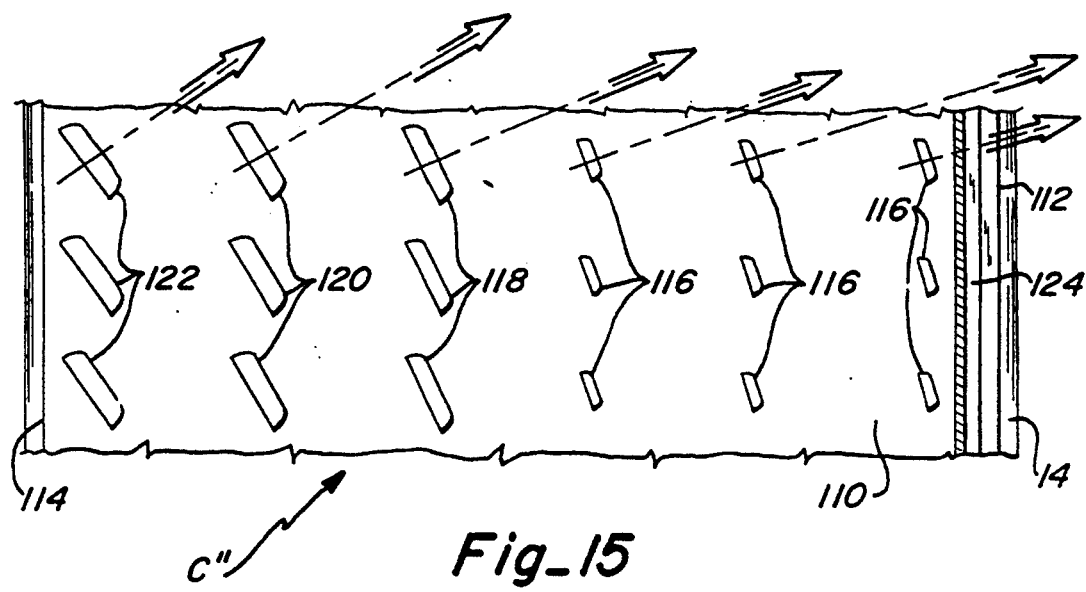
Fig_15
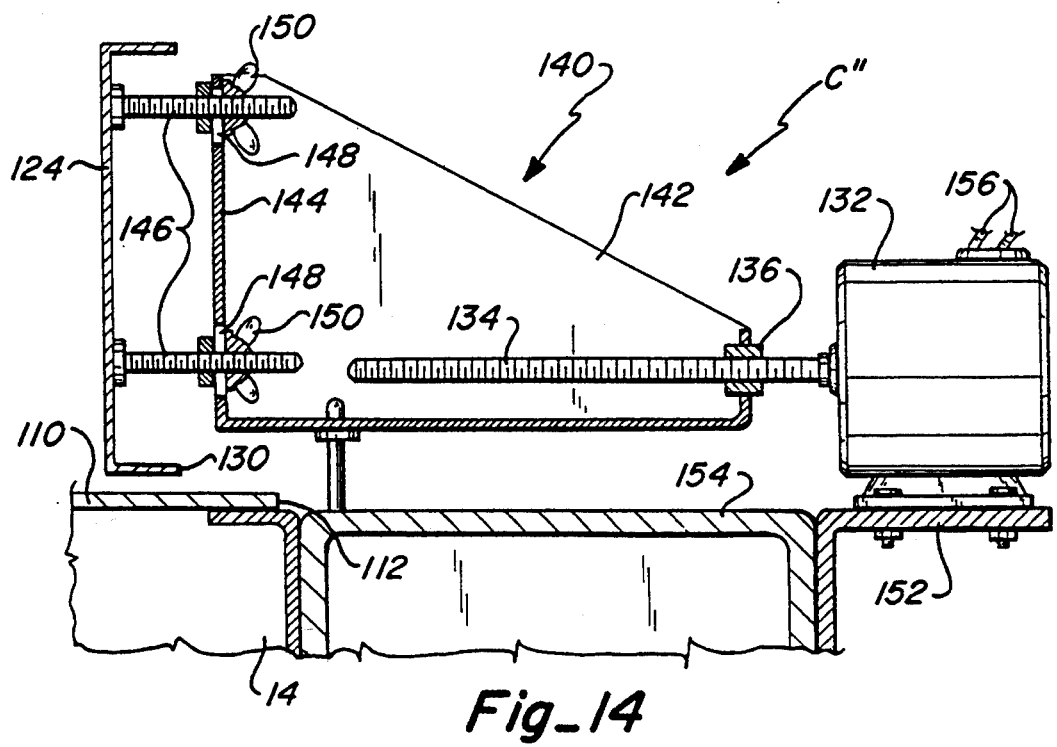
Fig_14

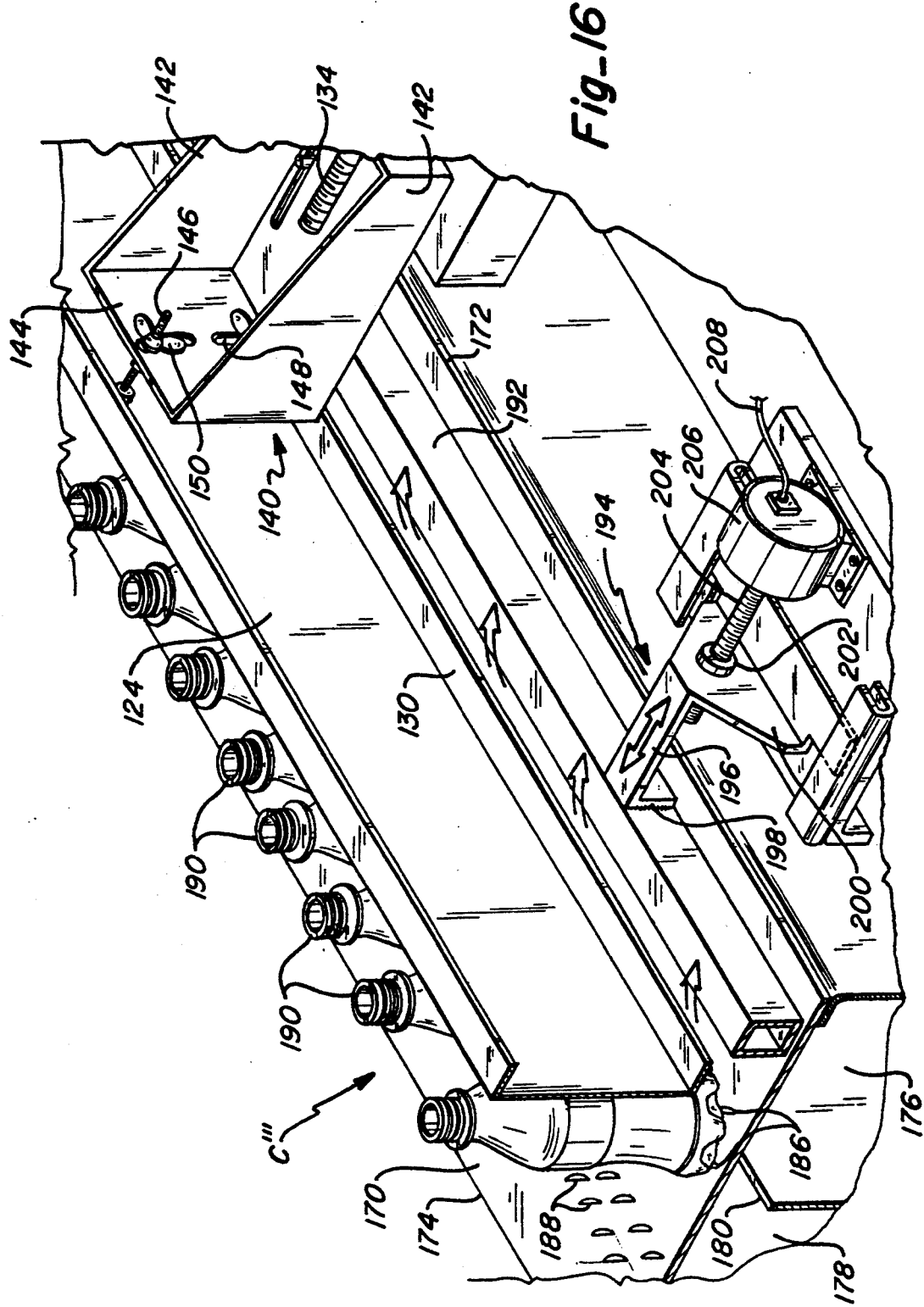
Fig_16

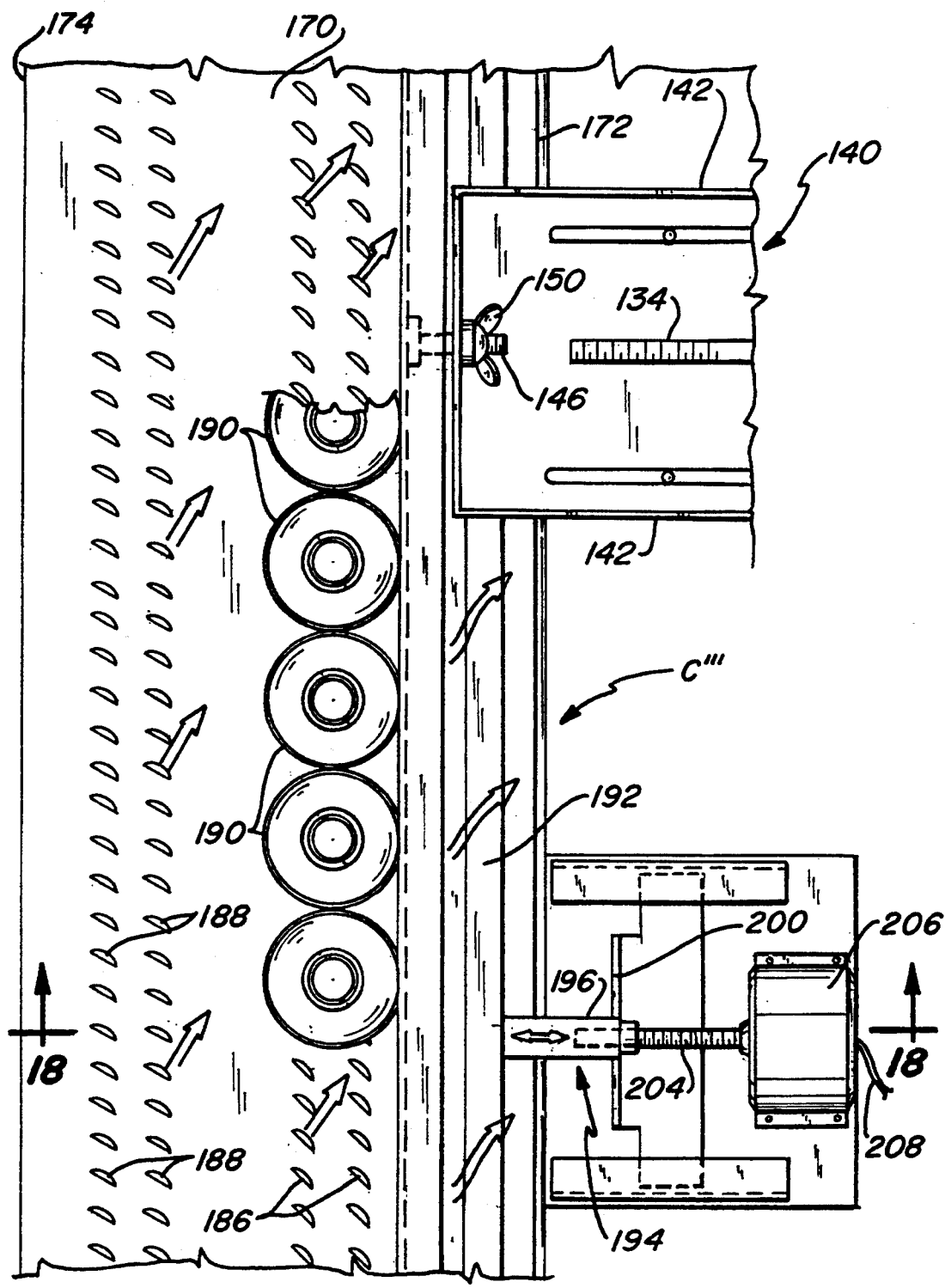
Fig_17

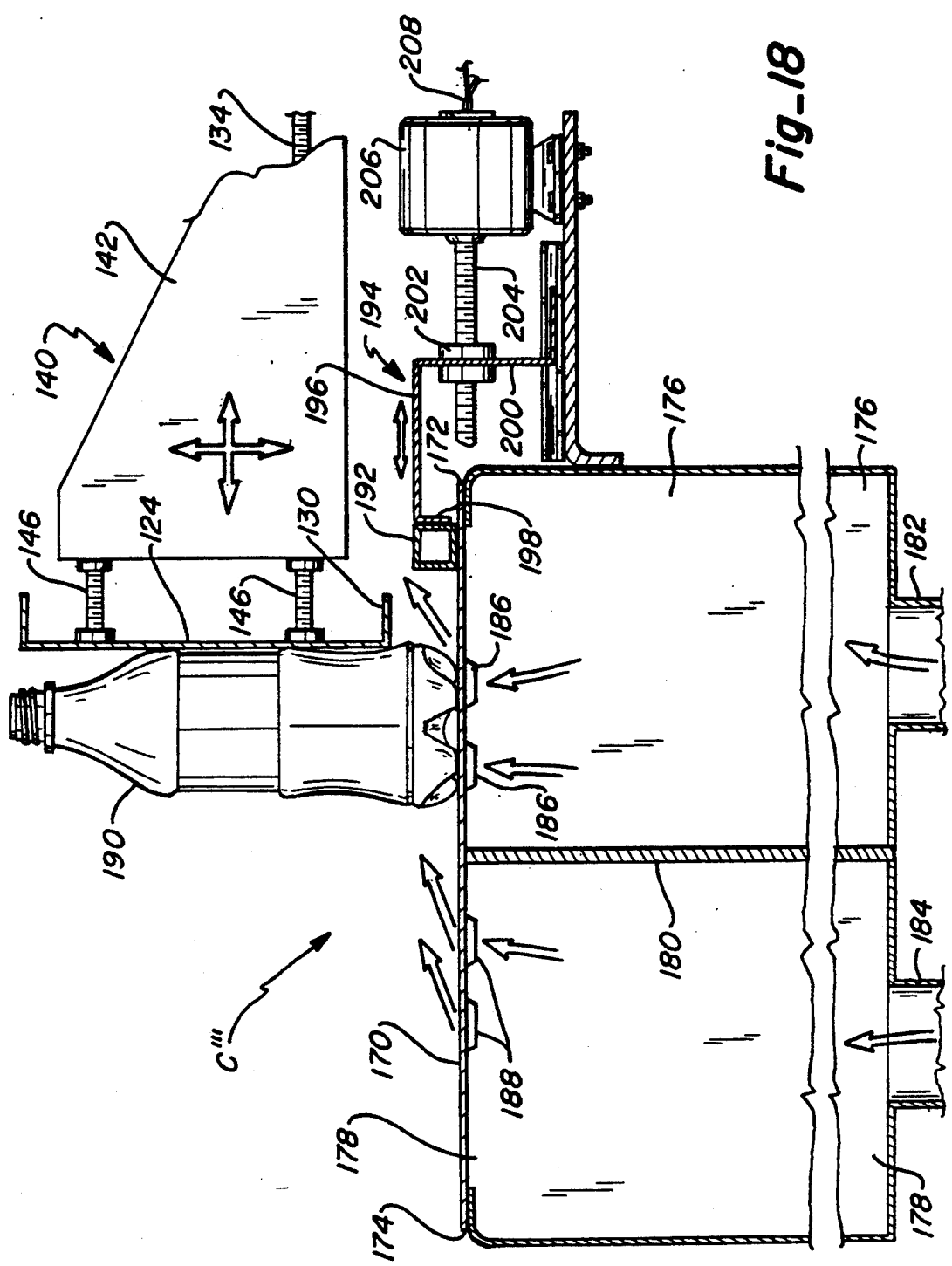

CONTROLLED SPEED SINGLE FILE CONVEYOR FOR MULTISIZE ARTICLES

This application is a continuation-in-part of my co-pending U.S. patent application Ser. No. 08/180,968, filed Jan. 14, 1994.

TECHNICAL FIELD

This invention relates to a device for moving empty cylindrical articles, such as beverage containers, in single file. More particularly, the device relates to a single file conveyor in which the speed of movement of the containers along the conveyor can be controlled to minimize the possibility of damage and upsetting.

BACKGROUND ART

It is often necessary in a container manufacturing plant to convey containers from a mass into single file and to convey the single file containers at a desired predetermined speed. A problem associated with conventional air conveying equipment for conveying containers in single file is that the speed is not easily controlled and, in fact, the containers tend to reach extremely high speeds if uncontrolled, resulting in damage to the containers. Also, when the containers strike each other at high speed one or more of the containers may be upset causing the line of containers to jam. There is an ever increasing volume of air moving in the downstream direction from the upstream end of the conveyor to the downstream end. This causes the containers to tend to reach a terminal velocity, if not restrained, which may be substantially equal to the velocity of the air passing through the louvers or air jets supplying air to the conveying surface.

The mass of containers need to be fed into single file for supplying the containers to decorators, base coaters, and other apparatus in the plant which must perform an operation on or with respect to the container.

One such single filing apparatus is disclosed in my U.S. Pat. No. 4,462,720 for "Air Table System".

This device supports containers on a table by a layer of air provided by air jets slanted in the downstream direction toward a single file conveying zone. An imperforate cover is placed above the surface of the table a distance slightly greater than the longitudinal dimension of the containers being transported and is positioned over at least a portion of the single file conveying zone. Blow-back jets are connected to a source of air under pressure for supplying air in the single file conveying zone in opposition to the direction of normal flow of the objects. By use of this apparatus, a mass of containers can be rearranged into single file arrangement for discharge at the downstream end of the table.

Another single filer is shown in my U.S. Pat. No. 4,561,806 for "Vertical Single Filer Conveyor System". In this apparatus, containers are fed from a mass of containers onto a table which has at least three zones extending from an upstream location. The containers are supported and moved by a prearranged pattern of flotation air jets. In addition, a row of acceleration jets, which are larger in size than the flotation jets, are located in the table adjacent to and spaced in parallel relation to converging sides of the table to form two converging rows of acceleration jets. Means is provided to incrementally increase the volume and velocity of air through the acceleration jets between each of the three zones from the upstream location to the downstream location to accelerate and longitudinally separate the objects as they move along the table from the upstream location to the downstream location so that the converging of the sides coacts with the acceleration jets to converge longitudinally separated containers in a prearranged pattern to bring them into single file. This device has been found to be very satisfactory for placing smooth decorated containers in single file at relatively high speed.

None of these devices provide for controlling the speed of the containers as they move in single file along the conveyor.

DISCLOSURE OF THE INVENTION

In accordance with this invention, a controlled speed single file conveyor is provided for conveying upright cylindrical articles, such as containers, from an upstream location to a downstream location. The single file conveyor has a deck plate extending from the upstream location to the downstream location. The deck plate has an inboard side edge and an outboard side edge and a plurality of rows of louvers extend generally parallel to one of the side edges. At least some of the louvers are angled so that air discharged through these louvers has a force vector component toward the one side edge and a force vector in the downstream direction. A plenum is connectable to a source of air pressure and is attached to the underside of the deck plate.

In one form of the present invention, a vertical barrier or wall is positioned above the deck plate and adjacent to the inboard side edge. The wall has a lower edge positioned above the upper surface of the deck plate. This wall can be selectively raised and lowered to raise and lower the lower edge with respect to the deck plate to control the amount of air exhausted over the inboard edge of the deck. The rows of louvers are parallel to the edges of the deck plate. The louvers in each row are at an angle to the one side edge of the deck plate. This angle can be adjusted between 0° and 90° to control the downstream speed of the containers by controlling the downstream force component exerted by the air coming through the louvers versus the lateral force component exerted by the air. As used herein, 0° is the angle at which the air through the louvers is directed straight toward the wall and 90° is the angle in which the air through the louvers is in the downstream direction and parallel to the wall. The greater the angle, the greater the speed of the containers and vice versa. The greater the spacing of the lower edge of the wall above the deck plate, the more air that is exhausted over the inboard edge of the deck and, hence, the slower the downstream speed of the containers and vice versa.

In another form of the invention, a conveyor is provided for conveying lightweight articles of both smaller and larger diameter at separate times, wherein a vertical barrier is adjustable in either the inboard or outboard direction to control the number of active rows of louvers acting on the articles as they move along the conveyor from an upstream location to a downstream location. Sets of rows of louvers are provided which are progressively larger and progressively angled toward the downstream direction from the inboard side of the conveyor to the outboard side of the conveyor. When used with larger articles, the vertical barrier is moved to the inboard side of the conveyor so that the smaller louvers are exposed under the articles. Since the larger articles have larger diameters, they need less air under them to create the necessary downward force under them to hold them in upright position. Conversely, for the smaller articles, the vertical barrier is moved inboard so that the articles are positioned over the larger louvers. This causes a larger volume of air to move under these smaller diameter articles to create enough downward force to hold them in upright position. In both instances the rapidly moving air under the articles creates a low pressure area, resulting in a downward force on the containers which maintains them in an upright position as they move along the conveyor from an upstream location to a downstream location. Additionally, sufficient air flow is provided in each instance to move the articles from an upstream location to a downstream location.

In a still further alternative embodiment, a further control of the air exhausted between the deck and the lower edge of the vertical barrier is provided. This adjustment includes a longitudinal bar which is positioned between the lower edge of the vertical barrier and the deck plate and is mounted for lateral movement in the inboard and outboard directions so that the space between the lower edge of the vertical barrier and the top edge of the bar can be varied to provide airflow control.

By the method of this invention, the air which is traveling downstream tends to flow along the wall because of the Coanda Effect. This flow of air creates a low pressure area between the containers and the wall because of Bernoulli's Principle so that the containers tend to be held against the wall and move along the deck plate in single file. Additionally, a low pressure area is created under each container which tends to hold them in upright position.

Also in accordance with the method of this invention, the angle of the louvers toward the inboard edge can be varied to vary the lateral force component and downstream force component of the air to control and vary the downstream speed of the container along the deck plate from the upstream location to the downstream location.

The method further includes varying the spacing between the bottom of the barrier and the deck plate to control the amount of air that is exhausted over the inboard edge of the deck plate to control the speed of the containers as they move from the upstream to the downstream location.

The method also includes providing louvers adjacent the inboard edge at a very shallow angle to the surface of the deck plate to create a low pressure area under the bottom of each of the smaller diameter containers, in accordance with Bernoulli's Principle, to assist in holding each of them in a substantially vertical upright position without tipping over. The angle of the louvers to the surface of the deck plate can be increased in at least some of the rows of louvers in the outboard direction to provide more air against the sides of larger diameter containers to assist in moving them downstream, while at the same time reducing the amount of air passing under the larger diameter containers to reduce the downward force on them. Since the larger diameter containers are more stable, they require a smaller downward force to hold them in an upright position than do the smaller diameter containers. On the other hand, the larger diameter containers require more air against their sides to exert a downstream force to move them along the conveyor in the downstream direction. It will be apparent that this single file conveyor will work with a wide variety of container profiles having different bottom configurations. It will work with aluminum containers and plastic bottles of all types, including those with petaloid bottoms.

The method further contemplates laterally adjusting the vertical barrier. For larger diameter articles, the vertical barrier is moved toward the outboard edge to position the larger diameter articles over smaller louvers. For smaller diameter articles, the vertical barrier is moved away from the inboard edge and toward the outboard edge to position the smaller diameter articles over larger louvers. In this way a greater air flow is provided under the smaller diameter articles and a lesser air flow is provided under the large diameter articles so that a sufficient downward force is provided on both the larger diameter articles and the smaller diameter articles to hold each of them in upright position and to provide sufficient air flow in the downstream direction to move the articles from an upstream location to a downstream location.

Finally, the method contemplates laterally adjusting a bar positioned under the lower edge of the vertical barrier to control the flow of air between the bottom of the barrier and the bar to minimize dragging of the outside edge of the article on the deck plate and thereby minimize rotation and wobble of the container.

The foregoing apparatus and method provide superior control over that which is possible with conventional apparatus and methods. With the foregoing method and apparatus, a single filer has been provided which can be operated to move containers of different sizes and construction in single file at controlled speeds to minimize damage to the containers and tipping of the containers.

Additional advantages of this invention will become apparent from the description which follows, taken in conjunction with the accompanying drawings.

BRIEF DESCRIPTION OF THE DRAWINGS

FIG. 1 is a perspective view of a single file conveyor constructed in accordance with a first form of this invention and showing the flow of air across the deck surface;

FIG. 2 is an enlarged vertical section, taken along line 2—2 of FIG. 1, showing the construction of the deck plate and the adjustment means for raising and lowering the wall to exhaust air under the wall;

FIG. 3 is an enlarged horizontal section, taken along line 3—3 of FIG. 1, showing the arrangement of the containers along the conveyor and the flow of air and the exhausting thereof between the wall and the deck plate;

FIG. 4 is a top plan view, similar to FIG. 3, but showing the wall moved inwardly beyond the first row of louvers and showing the exhausting of air under the wall;

FIG. 5 is a horizontal section, taken along line 5—5 of FIG. 4, showing the relationship of the vertical barrier and its adjustment means with respect to the deck plate;

FIGS. 6A through 6D are each an enlarged horizontal section, taken along line 6—6 of FIG. 4, showing the flow of air through the deck plate and past the bottom of each of four types of containers;

FIG. 7 is a fragmentary horizontal section, on a reduced scale, taken along line 7—7 of FIG. 4, showing further details of the flow of air through the louvers and how it impacts the containers;

FIG. 8 is a top plan view of a single file conveyor constructed in accordance with another form of this invention which has an adjustable cover to control the active rows of louvers;

FIG. 9 is a horizontal section, taken along line 9—9, showing the adjustment means for the adjustable cover;

FIG. 10 is a fragmentary front perspective view of a further alternative embodiment of a conveyor constructed in accordance with this invention in which the vertical barrier is laterally adjustable and is positioned for use with a smaller diameter container;

FIG. 11 is a fragmentary front perspective view similar to FIG. 10, but showing the vertical barrier positioned for use with a larger diameter container;

FIG. 12 is a fragmentary top plan view of the conveyor of FIG. 11 showing the relative size and angle of the rows of louvers;

FIG. 13 is a fragmentary rear perspective view of the conveyor of FIG. 11 showing details of the mechanism for lateral adjustment of the vertical barrier;

FIG. 14 is an enlarged horizontal section, taken along line 14—14 of FIG. 13, showing further details of the adjustment mechanism;

FIG. 15 is a greatly enlarged fragmentary plan view of a portion of the deck surface of the conveyor showing the variation in size and angle of the respective rows of louvers;

FIG. 16 is a fragmentary perspective view of a still further embodiment of the invention which includes a laterally adjustable bar under the lower edge of the vertical barrier;

FIG. 17 is a fragmentary top plan view of the conveyor of FIG. 16; and

FIG. 18 is a fragmentary, enlarged, vertical section, taken along line 18—18 of FIG. 7, showing further details of the invention.

BEST MODE FOR CARRYING OUT THE INVENTION

In accordance with one form of this invention, a single file conveyor C is provided which includes a deck plate 10 having an upper surface through which a plurality of rows of louvers 12 extend to communicate the upper surface with a bottom surface. A plenum 14 is connected to the bottom surface and is supplied with air under pressure, as through an inlet pipe 16. The deck plate has an inboard side edge 18 and an outboard side edge 20. The rows of louvers 12 are parallel with the side edges. Articles, such as containers 22, are supported and moved downstream by air which is discharged from plenum 14 through louvers 12.

Because of the angle of the louvers with respect to the side edges, the air pressure has a lateral component toward the first side edge 18 and a downstream component which moves the containers from an upstream location to a downstream location. The lateral component of air pressure moves the containers against a barrier or wall 24 which has a lower edge 26, as best seen in FIG. 2, which is spaced above the upper surface of deck 10. The air is directed laterally across the surface of deck plate 10 and passes through the space between lower edge 26 of wall 24 and deck plate 10 and is exhausted over the inboard side edge 18 of the deck plate. Conveniently, wall 24 is mounted on a plurality of spaced brackets, such as vertical brackets 28, each of which has a lower end attached to plenum 14, as by a fastener 30, and each has a plurality of vertical slots 32. The wall 24 is attached to brackets 28 by means of screws 34 which pass through spacers 36 mounted between wall 24 and brackets 28. The ends of the screws extend through slots 32 and are attached to wing nuts 38 for holding the wall in any desired vertical adjusted position.

The closer the bottom edge 26 of wall 24 is to deck plate 10, the less the amount of air that will be exhausted over the inboard side 18 of deck 10. Since this air is not exhausted, it is directed downstream by the wall 24, as illustrated by arrows 39, thereby exerting an additional downstream force component on the containers, causing them to move at a higher downstream speed. The containers are in contiguous side-by-side relationship, as best seen in FIG. 3. Since the lateral component of air which strikes the wall 24 is deflected in the downstream direction (see arrows 39), the air travels at a relatively high rate of speed along the surface of the barrier creating a low pressure area 40 in the space between the contiguous containers 22 and wall 24 so that the containers tend to be held against the wall 24 as they move from an upstream location to a downstream location. Bernoulli's Principle states that the higher the velocity of the air the lower the pressure. Also, the Coanda Effect is a wall attachment phenomenon which causes the air to travel along the surface of wall 24 so that low pressure areas 40 are created therealong to cause the containers to move into and stay in substantial contact with wall 24. By this means, the containers are held in single file. If it is desired to slow the containers down, the barrier can be raised so that the lower edge 26 is further above the top surface of deck plate 10 causing more air to be exhausted, as illustrated by arrows 41, and less air to move in the downstream direction.

In FIG. 5, the screws 34 and the spacers 36 have been replaced with longer screws 42 and correspondingly long spacers 44 so that wall 24 is spaced inwardly from inboard edge 18 of the deck plate a distance equal to the distance between one row of louvers 12. In this way, more air is exhausted under the wall, as shown by arrows 41, and over the inboard edge 18 of deck plate 10 resulting in less air traveling downstream. This also will cause the containers to travel at a slower rate of speed since less air is moving in a downstream direction along wall 24, as shown by arrows 39. The row of louvers outside of wall 24 create a low pressure area which drafts air under lower edge 26 of wall 24 from the other rows of louvers. If desired the wall can be positioned inboard more than one row of louvers.

FIGS. 6A through 6D disclose the flow of air under different types of containers. For example, in FIG. 6A, a plastic bottle 46 is conveyed along deck plate 10 which has a concave bottom 48. Advantageously, louver 12 is at a very shallow angle with respect to the plane of the deck plate, the angle being on the order of 5° from horizontal. Thus, air exits plenum 14 through louvers 12, as shown by arrow 50, and then travels substantially parallel to the deck surface as shown by arrow 52. The air tends to travel along the deck surface because of the Coanda Effect, previously described. This rapidly moving air under bottom 48 of container 46 creates a low pressure under the container causing it to be pulled down toward the deck surface. This force is illustrated by dotted arrow 54. This downward force tends to hold the containers in an upright position even though they are very lightweight and have a high center of gravity. Because the louvers are at an angle to the downstream direction of the deck plate, as seen in FIG. 4, the containers tend to move toward the wall 24 and move downstream along the wall, as discussed above.

A second type of plastic container 56 is illustrated in FIG. 6B which has a shallow concave bottom 58 and, as with the embodiment of FIG. 6A, the air from plenum 14 passes in the direction of arrow 60 through louver 12 and follows the path of arrow 62. Thus, the air travels along the deck and creates a low pressure area under bottom 58 of container 56, creating a downward pressure in the direction of dotted arrow 64.

A third type of plastic container is shown in FIG. 6C wherein a plastic bottle 66 is conveyed which has a petaloid bottom or base 68. This base 68 has a plurality of feet 70, each foot having a center recess or groove 72. These recesses 72 serve a passageways for air as explained below. Air travels from plenum 14 in the direction of arrow 74 through louver 12 and along the path of arrow 76 through the passageway of recess 72. As with the previously described containers, a low pressure area is formed between the deck surface and base 68 causing a downward force in the direction of dotted arrow 78 which tends to hold the containers in an upright position.

FIG. 6D shows a conventional aluminum container 22 which has a bottom 80 which is slightly concave. Air passes from plenum 14 in the direction of arrow 82 through louver 12 and travels adjacent the bottom along the direction of arrow 84. This movement of air creates a low pressure area between deck 10 and bottom 80 resulting in a downward force as illustrated by dotted arrow 86.

It is clear from the description of FIGS. 6A through 6D that by blowing air from a plenum through louvers having a very shallow angle with respect to the surface of a deck plate, a reduced pressure can be provided under the bottom of the articles to hold them down against the deck plate so that the tendency for them to wobble and tip over is significantly reduced. The greater the static air pressure within the plenum, the higher the velocity of air passing through the louvers and the lower the air pressure under each article, thereby creating greater holding power against the deck. As illustrated, this principle is effective in handling articles of varying shapes and having different bases.

In many prior art devices for handling the plastic containers just described, they are normally conveyed by flanges on their necks which suspend them on a narrow track and air jets are used to move them along the track. This method is inefficient and the control of the articles is not very precise. In addition, because of the different height and diameter of the articles, the mechanism for suspending and conveying these articles must be capable of adjustment to a wide variety of sizes. This adds to the complexity and to the labor costs involved when changing the run of containers from one size to another. With the present invention, the only changes normally required to accommodate different containers is to adjust the height of the lower edge 26 of wall 24 above deck plate 10 and to adjust the static pressure in the plenum.

By way of example, a deck plate has been used in which the louvers are at an angle of 5° to the plane of the deck plate and have an open area of 0.0080 square inches. The lateral spacing between rows of louvers was 1.25" and the spacing between louvers in each row was 1.0". With the bottom of the wall or barrier spaced at 1.0" above the deck plate, two rows of operative louvers to the outboard side of the wall, and 17.0" of static pressure, twelve-ounce aluminum beverage containers were conveyed without tipping over or experiencing any damage. This same structure worked satisfactorily with twenty-four-ounce aluminum beverage containers with a spacing between the bottom edge of the wall and the deck plate being 0.5". Various sizes and shapes of plastic containers were also conveyed. In this regard, a two-liter plastic beverage container with a petaloid base was conveyed using five active rows of louvers and a spacing between the bottom edge of the wall and the deck plate of 1.0". It is possible to replace the deck plate with one that has a different pattern of louvers or louvers of a different size and angle with respect to the deck plate and with respect to the side wall.

The air which passes under the bottom of the containers as shown in FIGS. 6A through 6D is also illustrated in FIG. 7 by arrows 88, wherein the air, due to the Coanda Effect, stays adjacent to the surface of deck 10. However, some of the air passes along the path of arrows 90. This path is determined by the angle of the louvers and the further away the air travels from any given louver, the higher it rises above the deck plate. Thus, it ultimately will strike the side of a container 22 and tend to move the container in the direction in which the air above the surface of the deck is flowing. This air is used to control the movement of the containers along the deck surface. It will be apparent that the more outboard rows of louvers will have a greater effect on the forces exerted against the side of the containers than those louvers closest to the containers.

FIGS. 8 and 9 show a single file conveyor C' which has a multiple rows of louvers just like conveyor C. However, conveyor C' is provided with an adjustable louver cover 92 that extends over the outboard edge 20 of the conveyor and is adjustable to move it inboard or outboard to cover or expose additional rows of louvers. Any type of lateral adjustment means can be used. The louver cover is shown as having a depending flange 94 with spaced openings 96 through which spaced bolts 98 extend. The threaded end of bolts 98 are each received in a threaded member 100 which is mounted in the side wall of plenum 14.

The more rows of louvers that are exposed, the more air that is directed onto the side of the container from these outboard louvers, as illustrated in FIG. 7, thereby urging the containers to move in the direction of the flow of air. Conveniently, different portions of the conveyor may have the louvers adjusted at different angles. As shown in FIG. 8, an upstream portion A has louvers which are angled downstream at a very slight angle, such as 5° to 10°. In section B, the louvers are angled further downstream at a greater angle such as 20° to 30°. Finally, in section C, the louvers are angled downstream at a still greater angle, such as 45°. The greater the angle of the louvers in the downstream direction, the greater the force component of the air on the containers in the downstream direction and the faster the containers will move in that direction. It will be understood, that by varying the angle of the louvers the speed can be substantially controlled to increase it or decrease it, as desired. This provides an adjustment in addition to raising and lowering the bottom edge of wall 24.

An alternative embodiment includes a conveyor C" which is shown in FIGS. 10–15 wherein plenum 14 is provided with a deck plate 110 having an inboard edge 112 and an outboard edge 114. The deck plate 110 has a plurality of rows of louvers. The present invention will be described with respect to six rows of louvers but it will be understood to one skilled in the art that the number of rows could be increased or decreased and still incorporate the principles of this invention as described hereinafter.

As best illustrated in FIG. 15, the first three inboard rows of louvers 116 have a first relatively small size, such as 0.0080 square inches, and are at a relatively small downstream angle, such as 20°. The next row of louvers 118 are of a larger size, such as 0.0160 square inches and have a slightly greater downstream angle such as 25°. The next row of louvers 120 in the outboard direction may be the same size or larger than louvers 118 and have a slightly greater downstream angle, such as 30°. Finally, the outboard row of louvers 122 may be the same size or larger than louvers 118 and have a greater downstream angle than louvers 120, such as 35°. These louvers cooperate with laterally adjustable vertical wall or barrier 124 to provide a versatile conveyor for conveying both smaller diameter and larger diameter lightweight articles from an upstream location to a downstream location.

The static air pressure in plenum 14 can be in the range of 17 inches of static pressure. The angle of the louvers with respect to the deck can vary from 5° for louvers 116 up to 35° for louvers 122. The intermediate rows of louvers 118 and 120 can be at some intermediate angle to the deck plate. The shallower the angle to the deck plate, the more air that is directed under the container and the less air directed against the side of the container, thereby creating a greater downward force on the container to provide more stability in holding it in an upright position but less air against the side to provide a force to move the container in the downstream direction and toward the barrier.

When used with a small diameter lightweight container, such as container 126, shown in FIG. 10, wall 124 is moved in the outboard direction so that the container is supported above rows of louvers 118, 120, and 122. These larger louvers provide a greater volume of air under the container 126, which is made of a lightweight plastic and has either a concave bottom as shown in FIGS. 6A and 6B or a petaloid bottom as shown in FIG. 6C. These larger louvers provide a greater flow of air under container 126, causing a low pressure area in accordance with Bernoulli's Principle so that a downward force is exerted by the ambient air pressure on the container to hold it in an upright position as it moves from the upstream location to a downstream location along the conveyor. Because the surface area of the smaller diameter container 126 is small, it is necessary to have a greater flow of air under this container than is required under larger container 128 as shown in FIG. 11. Therefore, in FIG. 11, the vertical wall 124 is moved to the inboard side of deck plate 110. In this way, the larger container 128 is positioned over the smaller louvers 116 which create a lesser air flow than the larger louvers. Since the container 128 has a larger diameter and therefore a larger surface area, less air flow is necessary to provide the required low pressure area thereunder so that the ambient air pressure holds the container down against the deck in an upright position. The smaller articles are lighter in weight than the larger articles; and the downstream angle of the louvers, such as rows of louvers 116, under the smaller articles 126 is at a shallower downstream angle, such as 20°, so that the downstream force component is not so great as to tip the articles over or to move them at excessive downstream speeds. However, since the larger diameter articles 128 are heavier, the angle of the outboard rows of louvers 118, 120 and 122 increases progressively to less shallow angles, such as 25°, 30°, and 35°, respectively, as shown in FIG. 12 so as to provide an increasingly greater downstream force component on the larger articles for moving them from an upstream location to a downstream location.

It will be noted that vertical wall 124 has a lower edge 130 which is spaced above deck plate 110 so as to allow air to be exhausted thereunder, as described with respect to the previous embodiments. The vertical wall or barrier may be vertically adjustable, as described with respect to wall 24 of FIGS. 1–9 above, to control the amount of air being exhausted over the inboard side 112 of deck plate 110.

It will be understood that the specific angles for each row of louvers, both with respect to the side barrier and with respect to the deck plate, the number of rows of louvers, the height of the lower edge of the vertical barrier above the deck plate, and the static pressure are given by way of illustration only. The specific specifications chosen will be apparent to one skilled in the art depending on the particular characteristics of the containers to be conveyed and the particular conditions under which they are to be conveyed.

It also is desirable to provide means for lateral adjustment of wall 124. This adjustment can be accomplished manually or by a suitable mechanical device. By way of illustration only, as shown in FIGS. 13 and 14 one such mechanical device incorporates a plurality of reversible motors, such as motor 132 which has a screw threaded shaft 134 that is threadably received through a threaded bushing 136 mounted in a back wall 138 of a bracket 140. Bracket 140 has a pair of spaced side walls 142 which interconnect back wall 138 with a front wall 144. The brackets are secured to vertical barrier 124 by means of vertically spaced threaded posts 146. These posts extend through vertically spaced slots 148 in front wall 144 and the brackets are secured in place by means of wing nuts 150 in the desired vertically adjusted position. Conveniently, motor 132 is mounted on a support 152 attached to an arm 154 extending from plenum 14. The motor is connected, as by wires 156, to a three-positioned switch 158 which has a center-off position and can be moved to either side of the off position to reverse current to the motor to run it in opposite directions to move the vertical barrier inboard or outboard, as desired. The switch is connected to a source of electrical power by means of wires 160, as shown in FIG. 13. A plurality of motors 132 may be connected in series along the vertical barrier to adjust it along its entire length.

It has been found with some containers, that when the vertical barrier is raised a sufficient distance above the deck plate to cause the container to move at a slow enough rate of speed, the lower end of the container moves under the lower edge of the vertical barrier and is tilted so that the outer edge drags along the deck plate. This then causes the container to rotate as it moves from an upstream location to a downstream location. The rotation in turn, may cause the container to wobble and ultimately tip over. Accordingly, the conveyor C''', shown in FIGS. 16–18, is designed to overcome this problem. Conveyor C''' has a deck plate 170 having an inboard edge 172 and an outboard edge 174 and is mounted on top of parallel plenums 176 and 178 which are separated by a center wall 180. Conveniently, inboard plenum 176 has an inlet 182 for supplying air from a source at a selected pressure. Similarly, outboard plenum 178 has a separate inlet 184 for supplying air at a different pressure. The portion of deck plate 170 over inboard plenum 176 has a pair of rows of louvers 186 which are at an angle to the downstream direction, such as 45°. Similarly, the portion of the deck plate 170 over outboard plenum 178 has a pair of parallel rows of outboard louvers 188 which are spaced laterally from inboard louvers 186. Outboard louvers 188 are also at an angle, which from the perpendicular to the downstream direction may be within any suitable range such a between 55° and 70°. The inboard louvers are at a relatively shallow angle to the deck plate, such as 5° to 15°, so that most of the air is directed under the article being conveyed. In this way, a low pressure area is created under the article in accordance with Bernoulli's Principle. The outboard louvers 188 are arranged at a slightly greater angle to the deck plate, such as 20° to 35°, so that a greater portion of the air hits the sides of the containers and provides a force having a lateral force component which urges the articles 190 against vertical barrier 124 and a downstream force component which moves the articles from an upstream location to a downstream location. The vertical barrier 124 is identical to that disclosed in FIGS. 12–15 and is similarly mounted and adjusted for vertical and lateral movement. In the embodiment of FIGS. 16–18 the vertical barrier 124 is positioned so that lower edge 130 is at a much greater distance above the deck plate than was true in the embodiment of FIGS. 12–15. Additionally, a longitudinal bar 192 is provided which is mounted for lateral sliding movement on the top of deck plate 172 below lower edge 130 of vertical barrier 124 for inboard and outboard movement with respect thereto. To accomplish this movement, one or more brackets 194 are connected to the bar 192 as shown wherein each bracket has a horizontal leg 196 terminating in a downwardly extending flange 198 attached to bar 192 as by welding. The other end of leg 196 terminates in a downwardly extending flange 200 having a grommet 202 for receiving threaded shaft 204 of reversible motor 206, connected to a suitable power source by wire 208. As best seen in FIG. 18, air is exhausted from the deck plate through the space formed between lower edge 130 of vertical barrier 124 and adjustable bar 192. When bar 192 is moved to the left, i.e., in the outboard direction, the space between edge 130 and bar 192 will be smaller thereby reducing the flow of exhaust air therethrough. Conversely, when bar 192 is moved to the right, i.e., in the inboard direction, the space between lower edge 130 of vertical barrier 124 and adjustable bar 192 will increase in size allowing the exhausting of more air. With this control, the amount of air exhausted can be adjusted so that any tendency for the bottom portion of container 190 to be pulled under the lower edge 130 of vertical barrier 124 can be minimized. As discussed above, if the bottom portion of the container is pulled under the barrier, the container will tend to ride up on the inboard edge and then rotate causing it to wobble as it moves from the upstream to the downstream direction. This is an undesirable characteristic in that there is more tendency for the container to overturn. Thus, by proper adjustment of bar 192 the article can be kept in a substantially upright condition without overturning.

From the foregoing, the advantages of this invention are readily apparent. A simple yet efficient single file conveyor has been provided for moving containers therealong at a controlled speed. The control of the speed of the containers is accomplished in one or more ways. It can be done by changing the size of the louvers, by changing the angle of the louvers, by changing the static air pressure in the plenum, by changing the active number of rows of louvers, and by raising and lowering side barrier or wall. By providing louvers which have a very shallow angle with respect to the deck surface, most of the air being discharged through the louvers will travel along the deck surface due to the Coanda Effect. The movement of air along the deck will create a low pressure area under the containers so that they are pulled toward the deck and held in a substantially upright position to minimize wobble and tipping. The mass air flow above the deck moves the containers along the deck. The speed of movement depends on the volume and direction of the mass air flow above the deck surface.

Furthermore, the invention contemplates a single file air conveyor for movement of both smaller diameter and larger diameter lightweight articles or containers which can be accomplished by merely adjusting a vertical barrier in the inboard and outboard directions. The vertical barrier is moved in the outboard direction for smaller diameter light weight articles and is moved in the inboard direction for larger diameter lightweight articles. This movement of the vertical barrier cooperates with sets of rows of louvers in the deck plate which vary in size and angle. For example, the first three inboard rows of louvers may comprise a set which is smaller than each of the more outboard rows of louvers and are at a shallower downstream angle than the outboard rows of louvers.

Finally, the invention contemplates providing a laterally adjustable bar under the lower edge of the vertical barrier to control the exhausting of air from the deck plate so as to minimize any tipping of the container as it moves from an upstream location to a downstream location along the vertical barrier.

A method has been provided for bringing articles, such as beverage containers, into single file and for moving them along a side wall at a controlled speed. Also, a method is provided whereby a low pressure area is formed between the side wall and the contiguous adjacent containers so that they tend to move along this side wall. Additionally, a method is provided for creating a low pressure area under the bottoms of the containers to cause them to be pulled toward the deck surface to minimize wobbling and tipping. The method also contemplates conveying, at different times, both smaller diameter and larger diameter articles along the same conveyor. Finally, the method contemplates adjusting the exhausting of air from the deck plate by lateral movement of a longitudinal bar positioned adjacent and below the lower edge of the vertical barrier along which the container moves in order the minimize tipping of the container.

This invention has been described in detail with reference to particular embodiments thereof, but it will be understood that various other modifications can be effected within the spirit and scope of this invention.

I claim:

1. A controlled speed single file conveyor for conveying at different times upright cylindrical articles of a smaller diameter and upright cylindrical articles of a larger diameter from an upstream location to a downstream location, said single file conveyor comprising:

a deck plate extending from said upstream location to said downstream location, said deck plate having an upper surface, opposite inboard and outboard side edges, and an underside;

a plurality of rows of louvers, including at least one inboard row of louvers and at least one outboard row of louvers, communicating said upper surface and said underside, extending generally parallel to said inboard and outboard side edges of said deck plate from said upstream location to said downstream location, at least a portion of said louvers being angled so that air discharged through said angled louvers has a force vector component toward said inboard side edge and a force component vector in a downstream direction;

a plenum connectable to a source of air under pressure and attached to said underside of said deck plate;

a laterally adjustable vertical wall positioned above said deck plate adjacent and parallel to said inboard side edge of said deck plate, said vertical wall having a lower edge positioned above said upper surface and parallel to said inboard side edge; and first means connected to said vertical wall for adjusting a lateral position of said wall in outboard and inboard directions to position the smaller diameter articles over at least said one outboard row of louvers and to position the larger diameter articles over at least said one inboard row of louvers.

2. Apparatus, as claimed in claim 1, wherein said plurality of rows of louvers includes:

a first plurality of rows of inboard louvers of a first smaller size and arranged at a first smaller angle with respect to the downstream direction of said conveyor; and a second plurality of rows of outboard louvers of a second larger size and arranged at least at a second greater angle with respect to the downstream direction of said conveyor.

3. Apparatus, as claimed in claim 2, wherein:

said second plurality of rows includes at least two rows of louvers, a most-outboard row thereof being at a greater downstream angle than a next inboard row thereof.

4. Apparatus, as claimed in claim 2, wherein:

at least a portion of said second plurality of rows of outboard louvers are at a greater angle to said deck plate than said first plurality of rows of inboard louvers.

5. Apparatus, as claimed in claim 2, wherein:

said first plurality of rows of inboard louvers includes at least two rows of louvers of the first smaller size at the first smaller angle with respect to the downstream direction of said conveyor; and said second plurality of rows of outboard louvers includes at least a first row of outboard louvers, adjacent a most-outboard row of said rows of inboard louvers, of the second larger size larger than said first smaller size at the second greater angle with respect to the downstream direction of said conveyor and a second row of outboard louvers adjacent said first row of outboard louvers of at least said second larger size and at a third angle with respect to the downstream direction of said conveyor.

6. Apparatus, as claimed in claim 5, wherein:

said second larger size is twice as large as said first smaller size.

7. Apparatus, as claimed in claim 5, wherein:

said first smaller angle is at a 20° angle in the downstream direction and said second greater and third angles are at increasingly greater angles from said first row to said second row in the downstream direction which vary from 25° to 35°.

8. Apparatus, as claimed in claim 1, wherein said adjusting means includes:

a reversible motor operatively connected to said vertical wall for selectively moving said vertical wall in either the inboard direction or in the outboard direction.

9. Apparatus, as claimed in claim 1, further including:

second means connected to said vertical wall to vertically adjust said lower edge of said vertical wall above said deck plate.

10. Apparatus, as claimed in claim 1, further including:

a laterally adjustable bar mounted below said lower edge of said laterally adjustable vertical wall mounted for lateral movement in the inboard and outboard directions to adjust a space between said lower edge of said vertical wall and said bar to control the air exhausted over said inboard edge of said deck plate.

11. Apparatus as claimed in claim 10, further including:

adjustment means connected to said bar for laterally positioning said bar.

12. Apparatus, as claimed in claim 10, wherein said plenum includes:

an inboard plenum under said inboard row of louvers and a separate outboard plenum under said outboard row of louvers, each of said plenums having separate inlets for supply of air to said respective plenums at different pressures.

13. A method of selectively conveying upright lightweight cylindrical articles having a first smaller diameter and upright lightweight cylindrical articles having a second larger diameter in single file at a controlled speed from an upstream location to a downstream location along a deck plate, the deck plate having an inboard edge, an outboard edge, a first set of a plurality of rows of inboard louvers of a first smaller size therethrough, a second set of a plurality of rows of outboard louvers of a second larger size therethrough, and a laterally adjustable wall, having a lower edge, which serves as a barrier along the inboard edge of the deck plate, said method comprising the steps of:

supplying air under pressure through the first and second sets of louvers so that the air has a lateral force component and a downstream force component; and selectively varying a lateral position of the wall to selectively position the smaller diameter articles over the second set of louvers for selectively conveying the smaller diameter articles along the deck plate and to selectively position the larger diameter articles over the first set of louvers for selectively conveying the larger diameter articles along the deck plate.

14. A method of selectively conveying first upright lightweight cylindrical containers having a first smaller diameter and second upright lightweight cylindrical containers having a second larger diameter in single file at a controlled speed from an upstream location to a downstream location along a deck plate, the deck plate having an inboard edge, an outboard edge, a plurality of rows of louvers therethrough, and a wall, having a lower edge, which serves as a barrier along the inboard edge of the deck plate, said method comprising the steps of:

selectively supplying air under the first smaller diameter containers at a first higher volume to hold them against the deck plate for selectively conveying the first smaller diameter containers along the deck plate; and selectively supplying air under the second larger diameter containers at a second lower volume to hold them against the deck plate for selectively conveying the second larger diameter containers along the deck plate.

15. A method, as claimed in claim 14, including the further step of:

creating a low pressure area between the articles and the wall so that the articles tend to be held against the wall and move along the deck plate in single file.

16. A method, as claimed in claim 14, including the further step of:

varying an angle of the louvers toward the inboard edge to vary a lateral force component and a downstream force component of the air therefrom to control and vary a downstream speed of the articles along the deck plate from the upstream location to the downstream location.

17. A method, as claimed in claim 14, including the further step of:

selectively positioning the larger diameter articles closer to the inboard edge of the deck plate; and selectively positioning the smaller diameter articles closer to the outboard edge of the deck plate.

18. A method, as claimed in claim 14, including the further step of:

positioning at least a most-inboard row of the louvers at a shallower angle to an deck plate than the angle of a most outboard row of the louvers is to the deck plate.

19. A method, as claimed in claim 14, including the further steps of:

providing a bar below the lower edge of the wall; and laterally adjusting the bar with respect to the lower edge of the lower wall to control the flow of exhaust air from the deck plate.

20. A method, as claimed in claim 19, including the further steps of:

supplying air at a first pressure to an inboard row of said rows of louvers; and an supplying air at a second pressure to outboard row of said rows of louvers.

* * * * *

UNITED STATES PATENT AND TRADEMARK OFFICE
CERTIFICATE OF CORRECTION

PATENT NO. : 5,451,125

DATED : September 19, 1995

INVENTOR(S) : Ronald A. Lenhart

It is certified that error appears in the above-identified patent and that said Letters Patent is hereby corrected as shown below:

Column 5, line 33, delete "7" and insert --17--;

Column 16, line 22, delete "an".

Signed and Sealed this

Twenty-first Day of April, 1998

Attest:

BRUCE LEHMAN

*Attesting Officer*  *Commissioner of Patents and Trademarks*